United States Patent
Nakamori et al.

(10) Patent No.: US 8,688,051 B2
(45) Date of Patent: Apr. 1, 2014

(54) MOBILE STATION AND MOBILE COMMUNICATION METHOD

(75) Inventors: Takeshi Nakamori, Yokohama (JP); Hiroyuki Ishii, Yokohama (JP); Mikio Iwamura, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 245 days.

(21) Appl. No.: 13/259,162

(22) PCT Filed: Mar. 24, 2010

(86) PCT No.: PCT/JP2010/055060
§ 371 (c)(1),
(2), (4) Date: Nov. 16, 2011

(87) PCT Pub. No.: WO2010/110302
PCT Pub. Date: Sep. 30, 2010

(65) Prior Publication Data
US 2012/0094607 A1    Apr. 19, 2012

(30) Foreign Application Priority Data
Mar. 24, 2009    (JP) ................................. 2009-072946

(51) Int. Cl.
*H04B 17/00*    (2006.01)

(52) U.S. Cl.
USPC ...................................... 455/67.11; 455/63.1

(58) Field of Classification Search
USPC ................................ 455/67.11, 63.1; 375/219
See application file for complete search history.

(56) References Cited

U.S. PATENT DOCUMENTS

| | | | |
|---|---|---|---|
| 2008/0318530 A1* | 12/2008 | Montalbano | 455/67.13 |
| 2009/0181637 A1* | 7/2009 | Mueller-Weinfurtner | 455/334 |
| 2010/0080135 A1 | 4/2010 | Ishii et al. | |
| 2011/0207414 A1* | 8/2011 | Nakamori et al. | 455/67.11 |

FOREIGN PATENT DOCUMENTS

| | | |
|---|---|---|
| JP | 2004-522326 A | 7/2004 |
| JP | 2005-533448 A | 11/2005 |
| JP | 2008-193617 A | 8/2008 |
| WO | 01/43333 A1 | 6/2001 |
| WO | 2004/010619 A1 | 1/2004 |
| WO | 2008/087941 A1 | 7/2008 |

OTHER PUBLICATIONS

Office Action for Japanese Application No. 2009-072946, mailed on Mar. 25, 2010, and English translation thereof (7 pages).
International Search Report w/translation from PCT/JP2010/055060 dated May 25, 2010 (4 pages).
3GPP TS 36.331 V8.4.0; "3rd Generation Partnership Project; Technical Specification Group Radio Access Network; Evolved Universal Terrestrial Radio Access (E-UTRA) Radio Resource Control (RRC); Protocol specification (Release 8)"; Dec. 2008, pp. 56-57, 61-62 (5 pages).

(Continued)

*Primary Examiner* — Lewis West
(74) *Attorney, Agent, or Firm* — Osha Liang LLP

(57) ABSTRACT

A mobile station (UE) according to the present invention includes: a measurement unit (13) configured to measure a radio quality of a serving cell and a peripheral cell; a filtering unit (14) configured to perform filtering on the measurement result; and a determination unit (15) configured to determine as to whether or not to notify the measurement result after the filtering. The filtering unit (14) configured to adjust a filter coefficient for filtering the measurement result, when the mobile station (UE) is in a discontinuous reception state.

6 Claims, 3 Drawing Sheets

(56) References Cited

OTHER PUBLICATIONS

3GPP TS 36.214 V8.2.0; "3rd Generation Partnership Project; Technical Specification Group Radio Access Network; Evolved Universal Terrestrial Radio Access (E-UTRA); Physical layer—Measurements (Release 8)"; Mar. 2008 (10 pages).

3GPP TS 36.300 V8.4.0; "3rd Generation Partnership Project; Technical Specification Group Radio Access Network; Evolved Universal Terrestrial Radio Access (E-UTRA) and Evolved Universal Terrestrial Radio Access Network (E-UTRA); Overall description; Stage 2 (Release 8)"; Mar. 2008 (126 pages).

3GPP TS 36.331 V8.5.0; "3rd Generation Partnership Project; Technical Specification Group Radio Access Network; Evolved Universal Terrestrial Radio Access (E-UTRA) Radio Resource Control (RRC); Protocol specification (Release 8)"; Mar. 2009 (203 pages).

3GPP TS 36.214 V8.5.0; "3rd Generation Partnership Project; Technical Specification Group Radio Access Network; Evolved Universal Terrestrial Radio Access (E-UTRA); Physical layer—Measurements (Release 8)"; Dec. 2008 (11 pages).

\* cited by examiner

MOBILE STATION AND MOBILE COMMUNICATION METHOD

TECHNICAL FIELD

The present invention relates to a mobile station and a mobile communication method.

BACKGROUND ART

In a mobile communication system including a plurality of cells, a mobile station UE (User Equipment) is configured to continue a communication by switching the cells, when moving from one cell to another cell. Such a cell switch is called "Mobility control", more specifically, called "handover".

Generally, in the mobile communication system, when a mobile station UE moves to a peripheral cell, and when a received power of a signal from the peripheral cell becomes stronger than a received power of a signal from a serving cell in the mobile station UE, the mobile station UE is configured to perform the handover to the peripheral cell.

That is, the mobile station UE needs to measure the received power of the signal from the serving cell and the peripheral cell simultaneously of transmitting to and receiving data to and from the serving cell.

It is noted that the received power of the signal from the peripheral cell or the serving cell is "received power of a reference signal of a downlink (RSRP: Reference Signal Received Power)" transmitted from the peripheral cell or the serving cell, for example.

With reference to FIG. 1, one example of the handover procedure will be specifically explained.

As illustrated in FIG. 1, in step S1, the mobile station UE measures the received power of the signal from the serving cell and the peripheral cell.

In step S2, the mobile station UE determines whether or not the received power of the signal from the peripheral cell satisfies the following (Equation 1).

(received power of signal from peripheral cell)+(hysteresis)>(received power of signal from serving cell)  (Equation 1)

When it is determined that the (Equation 1) is satisfied, the mobile station UE notifies, to a network, an event A3 for reporting the above-described measurement result, in step S2.

In this case, as a received power (radio quality) $F_n$ of a signal, values calculated by the following (Equation 2) and (Equation 3) are to be used.

Specifically, in the mobile station UE, an upper layer is configured to perform a filtering process (L3 Filtering) represented by (Equation 2), on a measurement value by a physical layer.

$$F_n = (1-a) \cdot F_{n-1} + a \cdot M_n \quad \text{(Equation 2)}$$

$$a = \frac{1}{2}^{(k/4)} \quad \text{(Equation 3)}$$

It is noted that a value "k" in (Equation 3) is to be notified in advance from the radio base station to the mobile station UE.

Further, in (Equation 2), "n" denotes an index relating to a measurement timing, "$F_n$" denotes a measurement result after filtering, "$F_{n-1}$" denotes a measurement result after filtering at a measurement timing one before, and "$M_n$" denotes a measurement result in the measurement unit.

In step S3, when the network receives a notification of the event A3, the mobile station UE determines to perform a handover on the cell relating to the received event A3.

In a mobile communication system of the LTE (Long Term Evolution) scheme, the DRX (Discontinuous Reception) control is applied.

The discontinuous reception control is applied when the radio base station eNB and the mobile station UE are in communication and there is no data that should be communicated, and the mobile station UE in a discontinuous reception state is configured to receive periodically, i.e., discontinuously, a downlink control signal transmitted via a PDCCH (Physical Downlink Control Channel).

A time at which the downlink control signal transmitted via the PDCCH is received is called "On-duration (reception interval)".

In such a case, since the mobile station UE has only to receive the downlink control signal transmitted via the physical downlink control channel PDCCH discontinuously, instead of at all timings, the power consumption of the battery can be reduced.

More specifically, as illustrated in 2, the mobile station UE is configured to receive the downlink control signal transmitted via the physical downlink control channel PDCCH only at the reception interval (5 ms in the example of FIG. 2) set in each DRX cycle (1280 ms in the example of FIG. 2) and other transceivers are configured to be turned off. As a result, the power consumption of the battery of the mobile station UE can be reduced.

It is noted that in the discontinuous reception state, in order to maximize the effect that the power consumption of the battery is reduced, the frequency of measuring the received power of the signal from the serving cell and the peripheral cell is reduced.

As described above, the mobile communication system of the LTE scheme adopts the discontinuous reception control when the radio base station eNB and the mobile station UE are in connection. That is, the state of each mobile station UE includes two types of states a discontinuous reception state and a non-discontinuous reception state according to the presence or absence of data to be communicated.

Here, the mobile station UE in the discontinuous reception state is generally configured to measure the serving cell and the peripheral cell only in the reception interval in the discontinuous reception control, in order to maintain the battery saving effect by the discontinuous reception control.

Generally, the measurement interval of the received power of the signal from the serving cell and the peripheral cell in the discontinuous reception state (hereinafter, referred to as "measurement interval in the discontinuous reception state") is longer than a measurement interval of the received power of the signal from the serving cell and the peripheral cell in a non-discontinuous reception state (hereinafter, referred to as "measurement interval in a non-discontinuous reception state").

This is due to the fact that in the discontinuous reception state, the mobile station UE measures the received power of the signal from the serving cell and the peripheral cell only in the reception interval, as described above, and thus, there is a problem that a measurement sample number decreases, as a result of which in order to solve this problem, the measurement sample number is increased to improve the measurement accuracy.

For example, the measurement interval in a non-discontinuous reception state is 200 ms, and the measurement interval in the discontinuous reception state takes a value obtained by making the DRX cycle five times greater. In this case, making the DRX cycle five times greater means equally to a value obtained by averaging five measurement results in the reception interval being resulting in the measurement result in the discontinuous reception state.

However, resulting from the fact that the measurement interval differs between the non-discontinuous reception state and the discontinuous reception state, the following problem occurs in the above-mentioned filtering process.

For example, now consider a case where an optimal value of "k" in the non-discontinuous reception state is "4". In this case, the above-described (Equation 2) is changed to:

$$F_n = 0.5 \cdot F_{n-1} + 0.5 \cdot M_n \quad \text{(Equation 4)}$$

As a result, based on the fact that the contribution of "$M_n$" that is the measurement result before filtering is half, an approximate measurement interval after filtering may be 400 ms. This value, 400 ms, is calculated by 200 ms÷0.5.

On the other hand, in the discontinuous reception state, when the DRX cycle is assumed to be 1280 ms and the above-described (Equation 4) is directly applied, an approximate measurement interval after filtering may be 12800 ms. This value, 12800 ms, is calculated by 6400 ms (1280 ms×5)÷0.5.

Generally, in the handover or other Mobility controls, when the handover or the other Mobility controls are delayed, it is not possible to communicate with the optimal cell, and thus, the communication quality deteriorates.

Therefore, in the above-mentioned discontinuous reception state, there is no problem that in order to improve the accuracy of the measurement result, the measurement is carried out in the averaging interval where the DRX cycle is made five time greater; however, the problem lies in the process of further filtering the measurement result measured in the averaging interval where the DRX cycle is made five time greater triggers the delay of the handover or other Mobility controls.

Therefore, the present invention is intended to overcome the above-described problem. An object of the present invention is to provide a mobile station enabling appropriate measurement of a peripheral cell and an appropriate handover when discontinuous reception control is applied, and a mobile communication method therefore.

SUMMARY OF THE INVENTION

A first aspect of the present invention is summarized as a mobile station communicating with a radio base station, the mobile station including: a measurement unit configured to measure a radio quality of a serving cell and a peripheral cell in the mobile station; a filtering unit configured to perform filtering on the measurement result by using a predetermined coefficient; a determination unit configured to determine as to whether or not to notify the measurement result after the filtering; and a notification unit configured to notify, to the radio base station, the measurement result, when it is determined that the filtered measurement result should be notified, wherein the filtering unit configured to adjust the predetermined coefficient, when the mobile station is in a discontinuous reception state.

In the first aspect of the present invention, the filtering unit can be configured to adjust the predetermined coefficient so that the measurement result filtered in a non-discontinuous reception state and the measurement result filtered in a discontinuous reception state are equal in a temporal averaging interval.

In the first aspect of the present invention, the filtering unit can be configured to perform the filtering based on the predetermined coefficient notified from the radio base station, in a non-discontinuous reception state, and to perform the filtering based on the adjusted predetermined coefficient, in a discontinuous reception state.

In the first aspect of the present invention, the filtering unit can be configured not to perform the filtering in a discontinuous reception state, when a measurement period by the measurement unit in a non-discontinuous reception state is smaller than a measurement period by the measurement unit in a discontinuous reception state.

In the first aspect of the present invention, the filtering unit can be configured to perform the filtering based on the following equations, $$F_n = (1-a) \cdot F_{n-1} + a \cdot M_n$$

$$a = \frac{1}{2}^{(k/4)}$$

where "n" denotes an index relating to a measurement timing, "$F_n$" denotes a measurement result after filtering, "k" denotes the predetermined coefficient, "$F_{n-1}$" denotes a measurement result after filtering at a measurement timing one before, and "$M_n$" denotes a measurement result in the measurement unit.

A second aspect of the present invention is summarized as a mobile communication method, including the steps of: (A) measuring a radio quality of a serving cell and a peripheral cell in a mobile station; (B) performing filtering on the measurement result by using a predetermined coefficient; (C) determining as to whether or not to notify the measurement result after the filtering; and (D) notifying, to the radio base station, the measurement result, when it is determined that the filtered measurement result should be notified, wherein in the step (C), the predetermined coefficient is adjusted, when the mobile station is in a discontinuous reception state.

As described above, according to the present invention, it is possible to provide a mobile station enabling an appropriate measurement of a peripheral cell and an appropriate handover when discontinuous reception control is applied, and a mobile communication method therefore.

DETAILED DESCRIPTION (Configuration of Mobile Communication System According to First Embodiment of the Present Invention)

Figure 1:
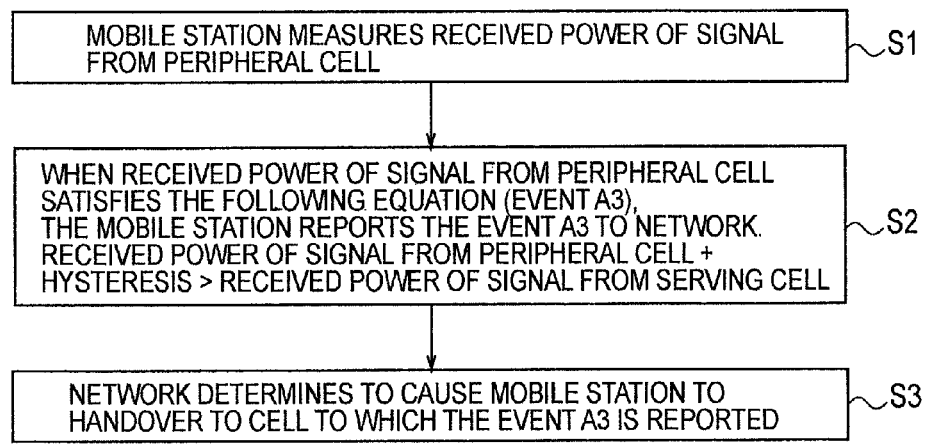
FIG. 1 is a flowchart illustrating a general operation of a handover.
Figure 2:
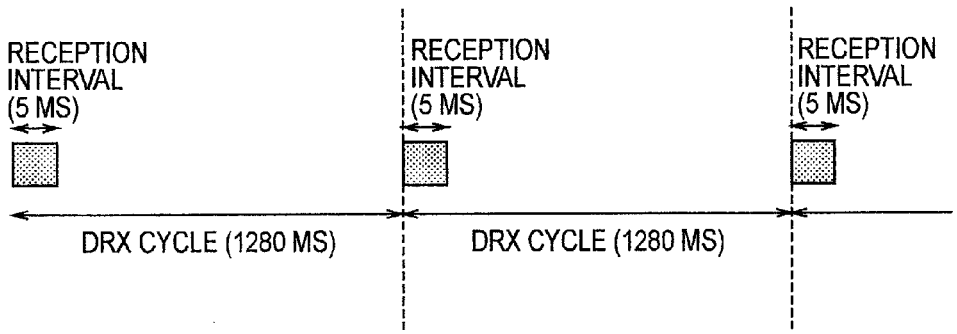
FIG. 2 is a diagram explaining a general operation of a mobile station in a discontinuous reception state.
Figure 3:
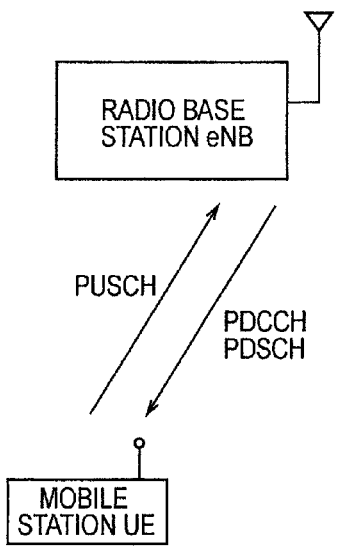
FIG. 3 is a diagram showing the entire configuration of a mobile communication system according to a first embodiment of the present invention.
Figure 4:
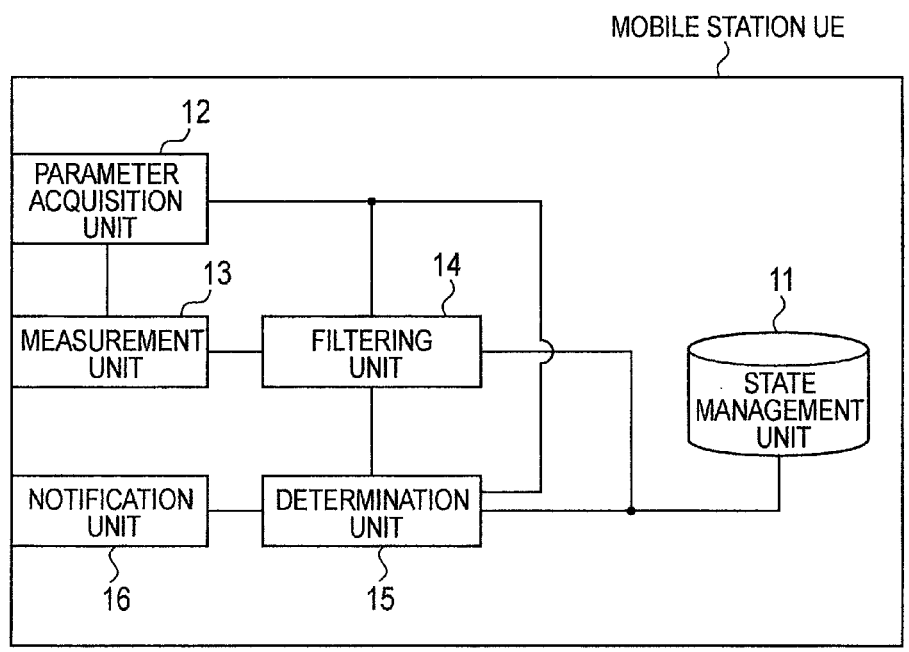
FIG. 4 is a functional block diagram of a mobile station according to the first embodiment of the present invention.

With reference to FIG. 3 to FIG. 4, the configuration of a mobile communication system according to a first embodiment of the present invention will be explained.

As shown in FIG. 3, a mobile communication system according to the embodiment is a mobile communication system of the LTE scheme. In the mobile communication system, it is considered that, as a radio access scheme, an "OFDM (Orthogonal Frequency Division Multiplexing)

scheme" is applied to a downlink and an "SC-FDMA (Single-Carrier Frequency Division Multiple Access) scheme" is applied to an uplink.

According to the OFDM scheme, a specific frequency band is divided into a plurality of narrow frequency bands (sub-carriers) and data is loaded on each frequency band and is transmitted. According to the OFDM scheme, the sub-carriers are densely arranged on the frequency axis without interference therebetween although a part of the sub-carriers overlap each other, so that high-rate transmission can be achieved and frequency use efficiency can be improved.

The SC-FDMA scheme, a specific frequency band is divided and a plurality of mobile stations UE transmit data using different frequency bands, so that it is possible to reduce interference among the plurality of mobile stations UE. According to the SC-FDMA scheme, because of its characteristic of small variation in transmission power, it is possible to achieve low power consumption and broad coverage of the mobile station UE.

In the mobile communication system according to the embodiment, the mobile base station eNB is configured to transmit a downlink control signal via a physical downlink control channel PDCCH, and to transmit a downlink data signal via a PDSCH (Physical Downlink Shared Channel).

Further, in the mobile communication system according to the embodiment, the mobile station UE is configured to transmit an uplink data signal via a PUSCH (Physical Uplink Shared Channel).

As illustrated in FIG. 4, the mobile station UE includes a state management unit 11, a parameter acquisition unit 12, a measurement unit 13, a filtering unit 14, a determination unit 15, and a notification unit 16.

The state management unit 11 is configured to manage whether or not the mobile station UE is in the discontinuous reception state. The state management unit 11 notifies, to the filtering unit 14 and the determination unit 15, information as to whether the mobile station UE is in the discontinuous reception state or in the non-discontinuous reception state.

The parameter acquisition unit 12 is configured to acquire a parameter relating to the Mobility control, from the radio base station eNB.

For example, a filter coefficient described later is included in the parameter relating to the Mobility control. Moreover, a parameter such as "Time-to-trigger" and hysteresis is also included in the parameter relating to the Mobility control.

The parameter acquisition unit 12 is configured to notify, to the filtering unit 14, the above-described filter coefficient.

The measurement unit 13 is configured to measure a radio quality of a serving cell and a peripheral cell of the mobile station UE.

For example, the measurement unit 13 may be configured to measure, as the radio quality of the serving cell and the peripheral cell of the mobile station UE, a received power of a signal (for example, RS (Reference Signal)) from the serving cell and the peripheral cell of the mobile station UE. It is noted that the received power of the reference signal may also be called RSRP (Reference Signal Received Power).

For example, in the case of a non-discontinuous reception, a measurement interval (Measurement period) in a physical layer is 200 ms, and in the case of a discontinuous reception, if the DRX cycle is assumed to be 1280 ms, a measurement interval (Measurement period) in the physical layer is 6400 ms (DRX cycle×5). It is noted that the DRX cycle is not limited to 1280 ms and may be a value other than 1280 ms.

A reason why the measurement interval is set to "DRX cycle×5" is provided below. In the case of the discontinuous reception, generally, the above-described measurement is performed only in the reception interval (On-duration) of the above-described DRX control, and thus, there is a problem that a measurement sample number is small and the measurement accuracy deteriorates. Therefore, when the measurement interval is set to "DRX cycle×5", the measurement sample number is increased, which serves to improve the measurement accuracy.

The measurement unit 13 is configured to notify, to the filtering unit 14, the measurement result of the radio quality of the serving cell and the peripheral cell of the mobile station UE.

The filtering unit 14 is configured to receive the measurement result of the radio quality of the serving cell and the peripheral cell of the mobile station UE from the measurement unit 13, to receive a filter coefficient (predetermined coefficient) from the parameter acquisition unit 12, and to calculate a filtering result by using the measurement result and the filter coefficient.

For example, the filtering unit 14 may be configured to perform the filtering according to the following equations:

$$F_n = (1-a) \cdot F_{n-1} + a \cdot M_n$$

$$a = 1/2^{(k/4)}$$

In this case, "n" denotes an index relating to the measurement timing, "$F_n$" denotes a measurement result after the filtering, "k" denotes the filter coefficient, "$F_{n-1}$" denotes a measurement result after the filtering at a measurement timing one before, and "$M_n$" denotes the measurement result in the measurement unit 13. The filter coefficient may not be "k" but "a".

Here, in the above-described filtering, it is configured that when the measurement result after the filtering "$F_n$" is calculated, the filter coefficient "a" is adjusted, and in this way, contribution rates of a latest measurement result "$M_n$" in the measurement unit 13 and a past measurement result after the filtering "$F_{n-1}$" are adjusted.

Therefore, in the case of the non-discontinuous reception state, if the measurement period is too long and the past measurement result after the filtering and the current measurement result after the filtering are separated too distantly, it is preferable to reduce (or eliminate) the contribution rate of the past measurement result after the filtering.

In this case, if the filter coefficient for the non-discontinuous reception state is "k=4 (i.e., a=½)", then the contribution rates of the past measurement result after the filtering and the current measurement result after the filtering are "50%", respectively.

Therefore, when the measurement period in the discontinuous reception state is "400 ms (two times the measurement period in the non-discontinuous reception state)", for example, the filtering unit 14 may be configured to increase the contribution rate of the current measurement result after the filtering by setting the filter coefficient for the discontinuous reception state to "k=8 (i.e., 1−a=¾)".

Thus, the filtering unit 14 is capable of adjusting the filter coefficient for the discontinuous reception state so that the measurement result filtered in the non-discontinuous reception state and the measurement result filtered in the discontinuous reception state are equal in the temporal averaging interval.

For example, the filtering unit 14 may be configured to perform the filtering based on the filter coefficient notified from the radio base station eNB in the non-discontinuous reception state, and to perform the filtering based on the filter coefficient, adjusted as described above, in the discontinuous reception state.

It is noted that when adjusting the predetermined filter coefficient, the filtering unit 14 may adjust the predetermined filter coefficient so as to obtain a result which is equal to a result obtained when a process in which the "in the discontinuous reception, filtering process is performed equally to the non-discontinuous reception or with the same frequency and the value of Mn in each filtering process is updated for each measurement interval" is performed, described later.

Moreover, for example, the filtering unit 14 may be configured not to perform the filtering in the discontinuous reception state, when the measurement interval in a non-discontinuous reception state is smaller than the measurement interval in the discontinuous reception state.

For example, in the discontinuous reception state, the filtering unit 14 may perform the filtering, when the filter coefficient for the discontinuous reception state is obtained by multiplying the filter coefficient by an adjustment coefficient for each DRX cycle previously determined, and this filter coefficient for the discontinuous reception state is used, based on the below-described equations.

$$F_n = (1-a) \cdot F_{n-1} + a \cdot M_n$$

$$a = \frac{1}{2}^{(k/4)}$$

In this case, "n" denotes an index relating to the measurement timing, "$F_n$" denotes a measurement result after the filtering, "k" denotes the filter coefficient for the discontinuous reception state, "$F_{n-1}$" denotes a measurement result after the filtering at a measurement timing one before, and "$M_n$" denotes the measurement result in the measurement unit 13.

For example, the configuration is such that the filtering unit 14 compares the measurement interval in the discontinuous reception state (averaging interval of the physical layer in the measurement unit 13 in the discontinuous reception state) and the measurement interval in the non-discontinuous reception state (averaging interval of the physical layer in the measurement unit 13 in the non-discontinuous reception state), performs the filtering by using the same filter coefficient as the filter coefficient for non-discontinuous reception state when the measurement interval in the discontinuous reception state is smaller than the measurement interval in the non-discontinuous reception state, and does not perform the filtering in the discontinuous reception state when the measurement interval in the discontinuous reception state is larger than the measurement interval in the non-discontinuous reception state.

Alternately, the filtering unit 14 may perform the filtering process in the discontinuous reception state with a frequency equal or identical to the frequency of the filtering process in the non-discontinuous reception state so that the measurement result filtered in the non-discontinuous reception state and the measurement result filtered in the discontinuous reception state are equal in a temporal averaging interval.

In this case, as the value of "$M_n$", the latest measurement result in the measurement unit 13 is to be input until an actual measurement is performed.

That is, when the measurement is performed in the reception interval (On-duration) of the DRX cycle present once in the DRX cycle, the measurement result of the immediately preceding reception interval (On-duration) is used as the value of "$M_n$" until a reception interval (On-duration) of next DRX control.

More specifically, when the measurement interval in a non-discontinuous reception state is 200 ms, the measurement interval in the discontinuous reception state is 6400 ms, and the DRX cycle is 1280 ms, the filtering process is performed in each 200 ms, and the value of "$M_n$" in the filtering process is updated in each DRX cycle, i.e., each 1280 ms.

In this case, in the filtering process during 1280 ms, the measurement result in the reception interval of the immediately preceding DRX control is used as the value of "$M_n$".

That is, if six filtering processes are performed during 1280 ms, then the same value (measurement result in the reception interval of the immediately preceding DRX control) is used during the six filtering processes.

In this case, as a result, the measurement result filtered in the non-discontinuous reception state and the measurement result filtered in the discontinuous reception state are equal in terms of a temporal averaging interval.

The determination unit 15 is configured to determine as to whether or not to notify the measurement result (Measurement Report) after the filtering, received from the above-described filtering 14.

For example, the determination unit 15 may be configured to determine that the above-described measurement result should be notified when a predetermined condition is continuously satisfied for a predetermined period or longer. In this case, the determination unit 15 may use the predetermined condition as the above-described (Equation 1). The predetermined period may be referred to as "Time-to-trigger".

The notification unit 16 is configured to notify, to the radio base station eNB, the measurement result, when it is determined by the determination unit 15 that the measurement result should be transmitted.

Specifically, the notification unit 16 is configured to notify, to the radio base station eNB, the measurement result via a physical uplink shared channel PUSCH. The measurement result may be referred to as "Measurement Report".

(Operation of the Mobile Communication System According to the First Embodiment of the Present Invention)

Figure 5:
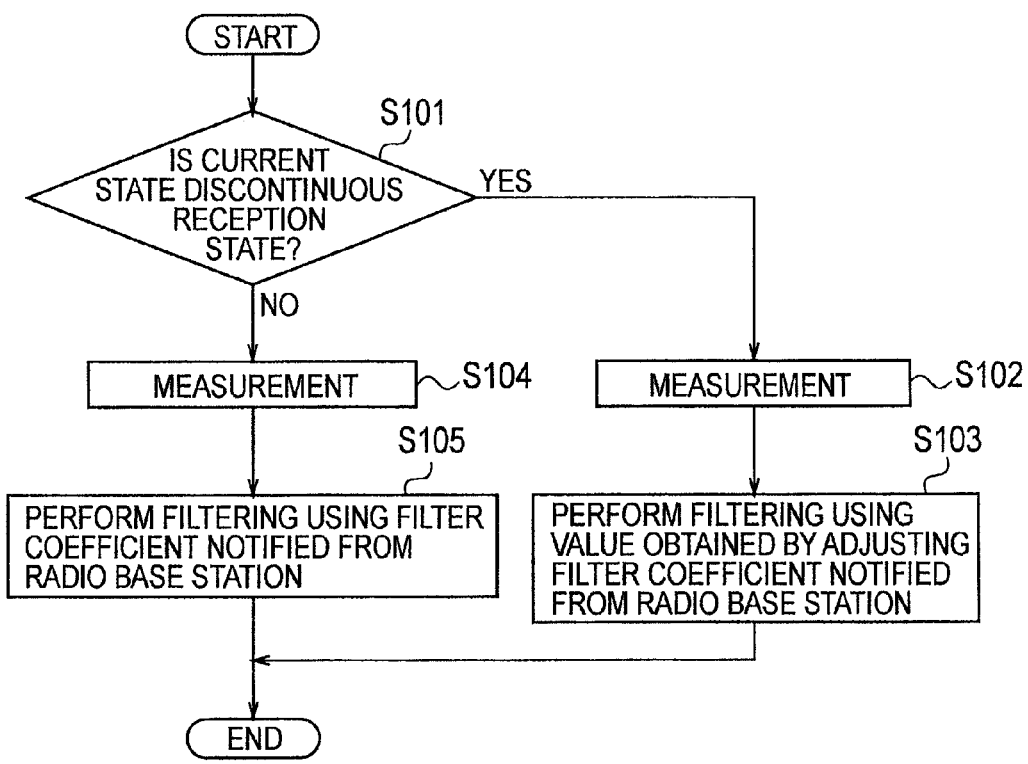
FIG. 5 is a flowchart illustrating the operation of the mobile station according to the first embodiment of the present invention.

With reference to FIG. 5, the operation of the mobile communication system according to the first embodiment of the present invention, specifically, the operation in which the mobile station UE according to the first embodiment of the present invention performs the filtering, will be explained.

As illustrated in FIG. 5, in step S101, the mobile station UE determines whether or not the current state is the discontinuous reception state.

When it is determined that the current state is the discontinuous reception state, the mobile station UE measures the radio quality of the serving cell and the peripheral cell, in step S102.

In step S103, the mobile station UE uses the value obtained by adjusting the measured radio quality of the serving cell and the peripheral cell with the filter coefficient notified from the radio base station so as to perform the filtering.

When it is determined that the current state is not the discontinuous reception state, the mobile station UE measures the radio quality of the serving cell and the peripheral cell, in step S104.

In step S105, the mobile station UE perform the filtering on the measured radio quality of the serving cell and the peripheral cell, by using filter coefficient notified from the radio base station.

It is noted that in the above-described first embodiment, there are two types of states, that is, the discontinuous reception state and the non-discontinuous reception state. However, instead thereof, even when there are three types of states, that is, a long discontinuous reception state, a short discontinuous reception state, and the non-discontinuous reception state, the mobile station and the mobile communication method according to the present invention can be applied.

For example, in each of the long discontinuous reception state and the short discontinuous reception state, the above-mentioned filter coefficient may be adjusted based on the measurement interval in each of the physical layers.

Further, in the above-mentioned first embodiment, the received power of the reference signal (RSRP) is used as the radio quality of the serving cell and the peripheral cell; however, instead thereof, RSRQ, RS-SIR, or CQI may be used. Alternately, as the radio quality of the serving cell and the peripheral cell, at least one of RSRP, RSRQ, RS-SIR, and CQI may be used.

It is noted that RSRQ (Reference Signal Received Quality) is a value obtained by dividing the received power of the reference signal of the downlink by RSSI (Received Signal Strength Indicator) of the downlink.

Here, the RSSI indicates the total reception level observed in the mobile station, and includes all of thermal noise, interference power from another cell, power of a desired signal from its own cell, etc. (see 3GPP TS36.214, V8.3.0 for the definition of the RSRQ).

Moreover, the RS-SIR is SIR (Signal-to-Interference Ratio) of the reference signal of the downlink.

Further, the CQI (Channel Quality Indicator) indicates radio quality information of the downlink (see 3GPP TS36.213 V8.3.0 for the definition of the CQI).

(Operation and Effect of the Mobile Communication System According to the First Embodiment of the Present Invention)

According to the mobile communication system based on the first embodiment of the present invention, even in a discontinuous reception state, the mobile station UE is capable of performing a filtering in an averaging interval equivalent to a filter coefficient optimized for a discontinuous reception state, and therefore, the mobile station UE can report a measurement result to a network at the appropriate timing so as to continue communication without occurring a communication breakdown, as a result of which it is possible to inhibit a load in the network and a consumption power of the mobile station UE, and also serve to improve the user convenience.

(Modified Example)

Note that operation of the above described radio base station eNB and the mobile station UE may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the radio base station eNB and the mobile station UE. Also, the storage medium and the processor may be provided in the radio base station eNB and the mobile station UE as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A mobile station communicating with a radio base station, the mobile station comprising:
a filtering unit configured to perform filtering on a measurement result of a radio quality of a serving cell and a peripheral cell in the mobile station, by using a filter coefficient; and
a notification unit configured to notify, to the radio base station, the measurement result, when it is determined that the filtered measurement result should be notified, wherein:
the filtering unit is configured to perform the filtering based on the following equations, after adjusting a filter coefficient "k" or "a", $$F_n = (1-a) \cdot F_{n-1} + a \cdot M_n$$

$$a = \frac{1}{2}^{(k/4)},$$

where "n" denotes an index relating to a measurement timing, "$F_n$" denotes a measurement result after filtering, "k" or "a" denotes the filter coefficient for a measurement interval 200 ms, "$F_{n-1}$" denotes a measurement result after filtering at a measurement timing one before, and "$M_n$" denotes a measurement result in the measurement unit; and the filtering unit is configured to adjust the filter coefficient so that the measurement result filtered in a non-discontinuous reception state and the measurement result filtered in a discontinuous reception state are equal in a temporal averaging interval.

2. A mobile station communicating with a radio base station, the mobile station comprising:
a filtering unit configured to perform filtering on a measurement result of a radio quality of a serving cell and a peripheral cell in the mobile station, by using a filter coefficient; and
a notification unit configured to notify, to the radio base station, the measurement result, when it is determined that the filtered measurement result should be notified, wherein:
the filtering unit is configured to perform the filtering based on the following equations, after adjusting a filter coefficient "k" or "a", $$F_n = (1-a) \cdot F_{n-1} + a \cdot M_n$$

$$a = \frac{1}{2}^{(k/4)}$$

where "n" denotes an index relating to a measurement timing, "$F_n$" denotes a measurement result after filtering, "k" or "a" denotes the filter coefficient for a measurement interval 200 ms, "$F_{n-1}$" denotes a measurement result after filtering at a measurement timing one before, and "$M_n$" denotes a measurement result in the measurement unit; and the filtering unit is configured to perform the filtering based on the filter coefficient notified from the radio base station, in a non-discontinuous reception state, and to perform the filtering based on the adjusted filter coefficient, in a discontinuous reception state.

3. A mobile station communicating with a radio base station, the mobile station comprising:
a filtering unit configured to perform filtering on a measurement result of a radio quality of a serving cell and a peripheral cell in the mobile station, by using a filter coefficient; and
a notification unit configured to notify, to the radio base station, the measurement result, when it is determined that the filtered measurement result should be notified, wherein:
the filtering unit is configured to perform the filtering based on the following equations, after adjusting a filter coefficient "k" or "a", $$F_n = (1-a) \cdot F_{n-1} a \cdot M_n$$

$$a = \frac{1}{2}^{(k/4)}$$

where "n" denotes an index relating to a measurement timing, "$F_n$" denotes a measurement result after filtering, "k" or "a" denotes the filter coefficient for a measurement interval 200 ms, "$F_{n-1}$" denotes a measurement result after filtering at a measurement timing one before, and "$M_n$" denotes a measurement result in the measurement unit; and
the filtering unit is configured not to perform the filtering in a discontinuous reception state, when a measurement period by the measurement unit in a non-discontinuous reception state is smaller than a measurement period by the measurement unit in a discontinuous reception state.

4. A mobile communication method, comprising the steps of:
(A) performing filtering on a measurement result of a radio quality of a serving cell and a peripheral cell in a mobile station, by using a filter coefficient; and
(B) notifying, to the radio base station, the measurement result, when it is determined that the filtered measurement result should be notified,
wherein:
in the step (A), the filtering is performed based on the following equations, after adjusting a filter coefficient "k" or "a", $$F_n = (1-a) \cdot F_{n-1} a \cdot M_n$$

$$a = \frac{1}{2}^{(k/4)}$$

where "n" denotes an index relating to a measurement timing, "$F_n$" denotes a measurement result after filtering, "k" or "a" denotes the filter coefficient for a measurement interval 200 ms, "$F_{n-1}$" denotes a measurement result after filtering at a measurement timing one before, and "$M_n$" denotes a measurement result in the measurement unit; and
in the step (A), the filter coefficient is adjusted so that the measurement result filtered in a non-discontinuous reception state and the measurement result filtered in a discontinuous reception state are equal in a temporal averaging interval.

5. A mobile communication method, comprising the steps of:
(A) performing filtering on a measurement result of a radio quality of a serving cell and a peripheral cell in a mobile station, by using a filter coefficient; and
(B) notifying, to the radio base station, the measurement result, when it is determined that the filtered measurement result should be notified,
wherein:
in the step (A), the filtering is performed based on the following equations, after adjusting a filter coefficient "k" or "a", $$F_n = (1-a) \cdot F_{n-1} a \cdot M_n$$

$$a = \frac{1}{2}^{(k/4)}$$

where "n" denotes an index relating to a measurement timing, "$F_n$" denotes a measurement result after filtering, "k" or "a" denotes the filter coefficient for a measurement interval 200 ms, "$F_{n-1}$" denotes a measurement result after filtering at a measurement timing one before, and "$M_n$" denotes a measurement result in the measurement unit; and
in the step (A), the filtering is performed based on the filter coefficient notified from the radio base station, in a non-discontinuous reception state, and the filtering is performed based on the adjusted filter coefficient, in a discontinuous reception state.

6. A mobile communication method, comprising the steps of:
(A) performing filtering on a measurement result of a radio quality of a serving cell and a peripheral cell in a mobile station, by using a filter coefficient; and
(B) notifying, to the radio base station, the measurement result, when it is determined that the filtered measurement result should be notified, wherein:
in the step (A), the filtering is performed based on the following equations, after adjusting a filter coefficient "k" or "a", $$F_n = (1-a) \cdot F_{n-1} a \cdot M_n$$

$$a = \frac{1}{2}^{(k/4)}$$

where "n" denotes an index relating to a measurement timing, "$F_n$" denotes a measurement result after filtering, "k" or "a" denotes the filter coefficient for a measurement interval 200 ms, "$F_{n-1}$" denotes a measurement result after filtering at a measurement timing one before, and "$M_n$" denotes a measurement result in the measurement unit; and
the filtering is not performed in a discontinuous reception state, when a measurement period by the measurement unit in a non-discontinuous reception state is smaller than a measurement period by the measurement unit in a discontinuous reception state.

* * * * *